(12) United States Patent
Babu et al.

(10) Patent No.: US 11,463,454 B2
(45) Date of Patent: Oct. 4, 2022

(54) SYSTEMS AND METHOD TO ADDRESS THE SECURITY VULNERABILITY IN WIRELESS NETWORKS

(71) Applicant: Carrier Corporation, Palm Beach Gardens, FL (US)

(72) Inventors: Ramesh Babu, Hyderabad (IN); Pirammanayagam Nallaperumal, Hyderabad (IN); Michael Ramoutar, Westford, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 222 days.

(21) Appl. No.: 16/491,661

(22) PCT Filed: Mar. 8, 2018

(86) PCT No.: PCT/US2018/021517
§ 371 (c)(1),
(2) Date: Sep. 6, 2019

(87) PCT Pub. No.: WO2018/165410
PCT Pub. Date: Sep. 13, 2018

(65) Prior Publication Data
US 2021/0136586 A1   May 6, 2021

Related U.S. Application Data

(60) Provisional application No. 62/468,435, filed on Mar. 8, 2017.

(51) Int. Cl.
*H04L 9/30* (2006.01)
*H04L 29/06* (2006.01)
(Continued)

(52) U.S. Cl.
CPC ...... *H04L 63/1408* (2013.01); *H04L 63/1433* (2013.01); *H04L 63/1466* (2013.01); *H04W 12/122* (2021.01)

(58) Field of Classification Search
CPC ............. H04W 12/122; H04L 63/1433; H04L 63/1466
See application file for complete search history.

(56) References Cited

U.S. PATENT DOCUMENTS

| 8,117,362 B2 | 2/2012 | Rodriguez et al. |
| 9,368,009 B2 | 6/2016 | Lee et al. |
| (Continued) | | |

FOREIGN PATENT DOCUMENTS

| EP | 2320605 A1 | 5/2011 |
| WO | WO2003049379 A1 | 6/2003 |
| WO | 2016093674 A1 | 6/2016 |

OTHER PUBLICATIONS

Behrang Fouladi et al; "Security Evaluation of the Z-Wave Wireless Protocol"; Black Hat Conference; Jan. 1, 2013; 6 pages.
(Continued)

*Primary Examiner* — Wasika Nipa
(74) *Attorney, Agent, or Firm* — Cantor Colburn LLP

(57) ABSTRACT

A method of operating a secure wireless network between a master controller and a secure device is provided. The method comprising: detecting at least one of a NONCE-GET and a NONCE-REPORT using a sniffer configured to detect wireless signals from a selected wireless protocol; determining that the NONCE-GET was not transmitted by a master controller or that the NONCE-REPORT was not in response to a NONCE-GET transmitted by the master controller, the master controller being in electronic communication with the sniffer; and transmitting a new NONCE-GET to the secure device from the master controller.

12 Claims, 3 Drawing Sheets

(51) Int. Cl.
*H04L 9/40* (2022.01)
*H04W 12/122* (2021.01)

(56) References Cited

U.S. PATENT DOCUMENTS

| | | | |
|---|---|---|---|
| 9,674,216 B2* | 6/2017 | Bußer | H04L 63/1458 |
| 2004/0249922 A1 | 12/2004 | Hackman et al. | |
| 2006/0070113 A1* | 3/2006 | Bhagwat | H04W 12/128 |
| | | | 455/410 |
| 2008/0291017 A1 | 11/2008 | Yermal et al. | |
| 2009/0016529 A1* | 1/2009 | Gopinath | H04L 63/1416 |
| | | | 380/270 |
| 2009/0315699 A1 | 12/2009 | Satish et al. | |
| 2010/0318685 A1 | 12/2010 | Kraus et al. | |
| 2013/0326595 A1 | 12/2013 | Myers et al. | |
| 2014/0066062 A1 | 3/2014 | Chen et al. | |
| 2014/0269660 A1 | 9/2014 | Dunn et al. | |
| 2015/0235173 A1 | 8/2015 | Hall et al. | |
| 2016/0043905 A1 | 2/2016 | Fiedler | |
| 2016/0189515 A1 | 6/2016 | Shapiro et al. | |
| 2016/0285904 A1 | 9/2016 | Ye et al. | |
| 2018/0359274 A1* | 12/2018 | Barahona | G08B 29/046 |

OTHER PUBLICATIONS

Notification of Transmittal of the International Search Report for International Application No. PCT/US2018/021517; Report dated Jun. 20, 2018; Report Received Date: Jun. 28, 2018; 6 pages.
Written Opinion of the International Searching Authorithy for International Application No. PCT/US2018/021517; Report dated Jun. 20, 2018; Report Received Date: Jun. 28, 2018; 9 pages.

* cited by examiner

SYSTEMS AND METHOD TO ADDRESS THE SECURITY VULNERABILITY IN WIRELESS NETWORKS

CROSS-REFERENCE TO RELATED APPLICATIONS

This application is a National Stage of International Application No. PCT/US2018/021517 filed Mar. 8, 2018, which claims priority to U.S. Provisional Patent Application Ser. No. 62/468,435 filed Mar. 8, 2017, both of which are incorporated herein by reference in their entirety.

BACKGROUND

The subject matter disclosed herein relates generally to the field of wire-less network security, and specifically to a method and apparatus for detecting an attack on a wireless network.

Commonly, there are many different wireless protocols for home automation and security, One such example is Z-Wave protocol. Z-Wave enforces methods for securing devices from hacking Despite these methods, certain scenarios expose the encryption key making the system vulnerable to attacks. The encryption key is exchanged only during a learn-in process. During this time a Z-Wave sniffer can capture these traces and decode the encryption key easily. Protection against the above method and brute force methods is greatly desired.

BRIEF SUMMARY

According to one embodiment, a method of operating a secure wireless network between a master controller and a secure device is provided. The method comprising: detecting at least one of a NONCE-GET and a NONCE-REPORT using a sniffer configured to detect wireless signals from a selected wireless protocol; determining that the NONCE-GET was not transmitted by a master controller or that the NONCE-REPORT was not in response to a NONCE-GET transmitted by the master controller, the master controller being in electronic communication with the sniffer; and transmitting a new NONCE-GET to the secure device from the master controller.

In addition to one or more of the features described above, or as an alternative, further embodiments of the method may include that the selected wireless protocol is Z-Wave protocol.

In addition to one or more of the features described above, or as an alternative, further embodiments of the method may include that the sniffer is separate and apart from the master controller.

In addition to one or more of the features described above, or as an alternative, further embodiments of the method may include that the sniffer is contained within the master controller.

In addition to one or more of the features described above, or as an alternative, further embodiments of the method may include restoring the state of the secured device after the master controller transmits the new NONCE-GET to the secure device.

In addition to one or more of the features described above, or as an alternative, further embodiments of the method may include activating an alarm on the master controller when it is determined that the NONCE-GET was not transmitted by a master controller or that the NONCE-REPORT was not in response to a NONCE-GET transmitted by the master controller.

According to another embodiment, a wireless communication security system is provide. The wireless communication security system comprising: a sniffer configured to detect wireless signals from a selected wireless protocol; a master controller in electronic communication with the sniffer and configured to wirelessly control a secure device. The master controller comprising; a processor; a memory comprising computer-executable instructions that, when executed by the processor, cause the processor to perform operations. The operations comprising: detecting at least one of a NONCE-GET and a NONCE-REPORT using the sniffer; determining that the NONCE-GET was not transmitted by a master controller or that the NONCE-REPORT was not in response to a NONCE-GET transmitted by the master controller, the master controller being in electronic communication with the sniffer; and transmitting a new NONCE-GET to the secure device from the master controller.

In addition to one or more of the features described above, or as an alternative, further embodiments of the wireless communication security system may include that the selected wireless protocol is Z-Wave protocol.

In addition to one or more of the features described above, or as an alternative, further embodiments of the wireless communication security system may include that the sniffer is separate and apart from the master controller.

In addition to one or more of the features described above, or as an alternative, further embodiments of the wireless communication security system may include that the sniffer is contained within the master controller.

In addition to one or more of the features described above, or as an alternative, further embodiments of the wireless communication security system may include that the operations further comprise: restoring the state of the secured device after the master controller transmits the new NONCE-GET to the secure device.

In addition to one or more of the features described above, or as an alternative, further embodiments of the wireless communication security system may include that the operations further comprise: activating, an alarm on the master controller when it is determined that the NONCE-GET was not transmitted by a master controller or that the NONCE-REPORT was not in response to a NONCE-GET transmitted by the master controller.

According to another embodiment, a computer program product tangibly embodied on a computer readable medium is provided. The computer program product including instructions that, when executed by a processor, cause the processor to perform operations comprising: detecting at least one of a NONCE-GET and a NONCE-REPORT using sniffer configured to detect wireless signals from a selected wireless protocol; determining that the NONCE-GET was not transmitted by a master controller or that that the NONCE-REPORT was not in response to a NONCE-GET transmitted by the master controller, the master controller being in electronic communication with the sniffer; and transmitting a new NONCE-GET to a secure device from the master controller.

In addition to one or more of the features described above, or as an alternative, further embodiments of the computer program may include that the selected wireless protocol is Z-Wave protocol.

In addition to one or more of the features described above, or as an alternative, further embodiments of the computer program may include that the snider is separate and apart from the master controller.

In addition to one or more of the features described above, or as an alternative, further embodiments of the computer program may include that the sniffer is contained within the master controller.

In addition to one or more of the features described above, or as an, alternative, further embodiments of the computer program may include that the operations further comprise: restoring the state of the secured device after the master controller transmits the new NONCE-GET to the secure device.

In addition to one or more of the features described above, or as an alternative, further embodiments of the computer program may include that the operations further comprise: activating an alarm on the master controller when it is determined that the NONCE-GET was not transmitted by a master controller or that the NONCE-REPORT was not in response to a NONCE-GET transmitted by the master controller.

Technical effects of embodiments of the present disclosure include incorporating a sniffer into a wireless master controller to detect an intruder to a secure wireless network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
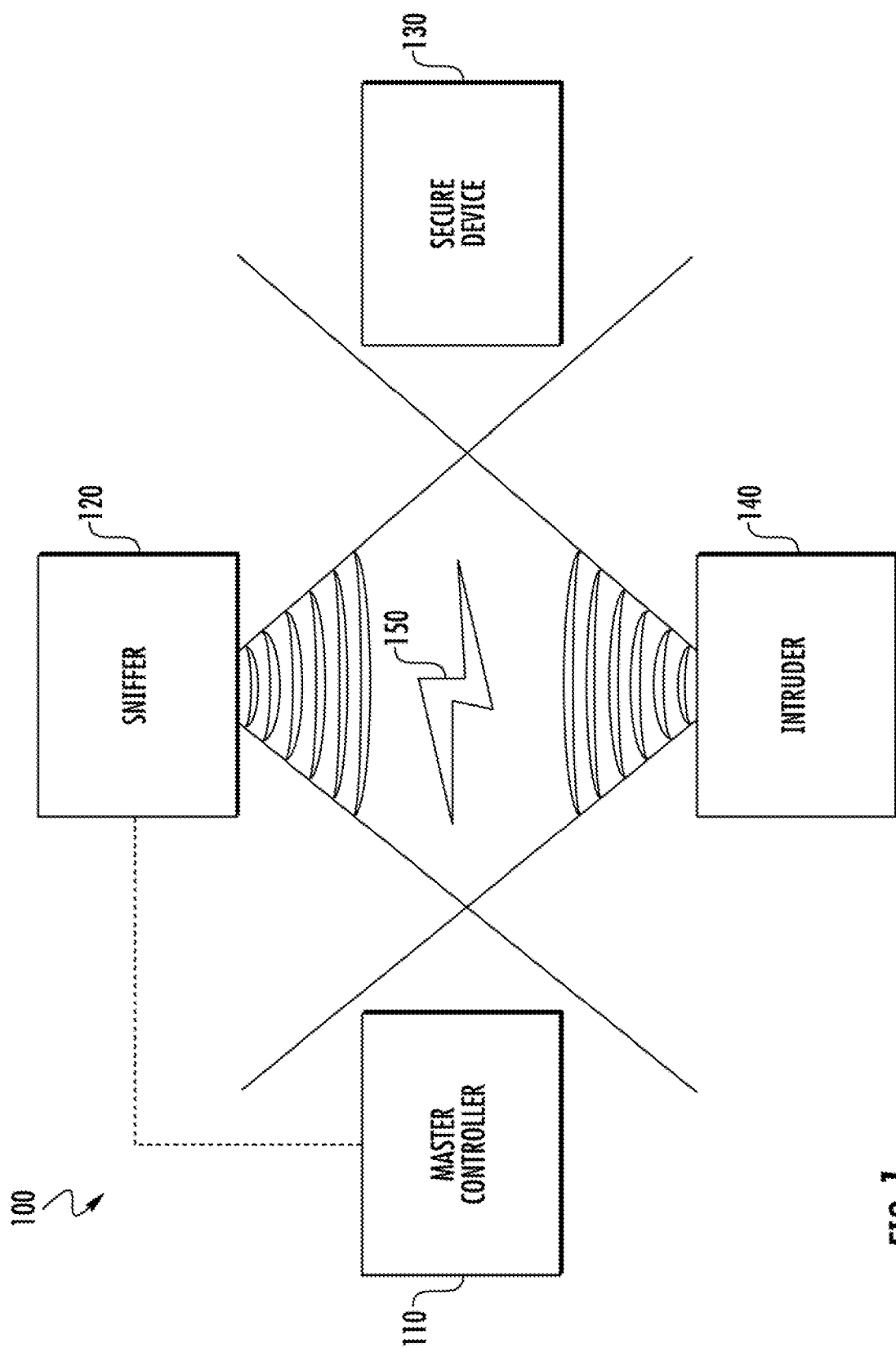
FIG. 1 illustrates a schematic view of a wireless communication security system, in accordance with an embodiment of the disclosure.

FIG. 1 shows a schematic view of a wireless communication security system 100, in accordance with an embodiment of the disclosure. With reference to FIG. 1, the wireless communication security system 100 includes a master controller 110 and a sniffer 120 in electronic communication with the master controller 110. The master controller 110 may include a processor and an associated memory. The processor may be, but is not limited to, a single-processor or multi-processor system of any of a wide array of possible architectures, including field programmable gate army (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In an embodiment, the sniffer 120 may be incorporated into or contained within the master controller 110. In an alternate embodiment, the sniffer 120 may be separate and apart from the master controller 110. If the sniffer 120 is separate and apart from the master controller 110 then the sniffer 120 is in electronic communication with the master controller 110 through a wired and/or wireless connection. The master controller 110 is configured to communicate with a secure device 130 using a selected wireless protocol, such as, for example, Z-Wave, Zigbee, WiFi, Bluetooth, WirelessHD, WiGig, or any other wireless protocol known to one of skill in the art. In an embodiment, the selected wireless protocol is Z-Wave. The secure device 130 may be an electronic device such as, for example, a door lock, a garage door, a light bulb, a thermostat, a kitchen appliance, a television, or any other smart device intended to be controlled wirelessly by a master controller 110. In one example, the master controller 110 is a cell phone and the secure device 130 is a door lock, thus once at security setup is complete the cell phone may be able to unlock and lock the door lock. The secure device 130 may include a processor and an associated memory. The processor may be, but is not limited to, a single-processor or multi-processor system or any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

A typical security setup of a secure device 130 occurs wirelessly where wireless signals 150 are exchanged between the master controller 110 and the secure device 130. Since the setup is occurring wirelessly an intruder 140 (e.g., a hacker) may be able to snatch the wireless signals 150 out of the air being sent back and forth between the master controller 110 and the secure device 130. The intruder may be using a sniffing device (similar to a sniffer 120 discussed further below) to detect and capture the wireless signals 150 being exchanged. These wireless signals 150 may contain secure information, such as an encryption key, that allows the intruder 140 to take over control of the secure device 130. The sniffer 120 is configured to detect an intruder 140 (through a method 300, discussed further below) and alert the master controller 110.

Figure 2:
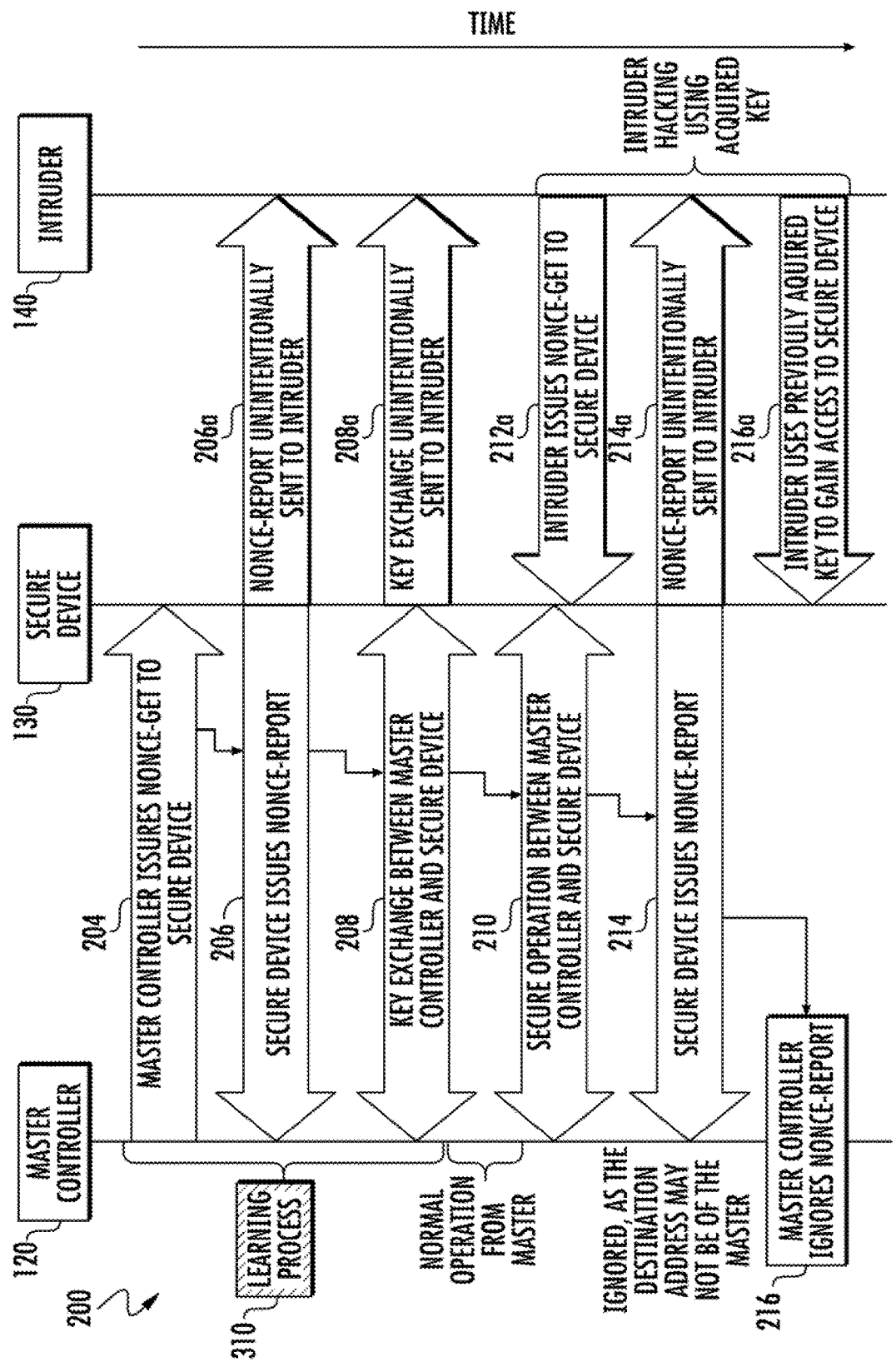
FIG. 2 is a flow chart of a method of operating a wireless communication system, in accordance with an embodiment of the disclosure.

Referring now to FIG. 2, with continued reference to FIG. 1. FIG. 2 shows a flow chart of a method 200 of operating a wireless communication system, in accordance with an embodiment of the disclosure. Specifically. FIG. 2 shows the learning process 310 associated with setting up a secure wireless network between a master controller 110 and a secure device 130 and how an intruder 140 could take control of the secure device 130 by capturing wireless signals 150 being transmitted between the master controller 110 and the secure device 130.

The learning process 310 occurs over blocks 204, 206, 208, and 210. Starting at block 204, the master controller 110 issues (i.e., transmits) a NONCE-GET to the secure device 130. At block 206, the secure device issues a NONCE-REPORT, which is unintentionally sent to an intruder 140 as well at block 206a. At block 208, the master controller 110 and the secure device 130 exchange a key so that they can operate over a secure connection. The key may be a select series of unique numbers. The key exchange is unintentional sent to the intruder 140 at block 208a. Once the key has been exchanged between the master controller 110 and the secure device 130, secure operation between the master controller 110 and the secure device 130 may occur utilizing the key. In one example, as described above, secure operation may be a cell phone being used to lock and unlock a smart door lock wirelessly.

The intruder 140 will then use die secure key to hack into the secure device over blocks 212a, 214a, and 216a. At block 212a, the intruder 140 issues a NONCE-GET to the secure device 130 and the secure device 130 will respond by issuing a NONCE-REPORT that gets sent to the master controller 110 at block 214 and the intruder at block 214a. The master controller 110 will ignore the NONCE-REPORT as not having been prompted by the master controller 110 because the destination address may be different from the master controller 110. This allows the intruder 140 to respond to the secure device 130 and use the previously acquired key to again access to the secure device 130. The intruder 140 could now control the secure device 130 as if it was the master controller 110. Thus, in the example continued from above, the intruder 140 would be able to unlock and lock the smart door lock wirelessly.

While the above description has described the flow process of FIG. 2 in a particular order, it should be appreciated that unless otherwise specifically required in the attached claims that the ordering of the steps may be varied.

Figure 3:
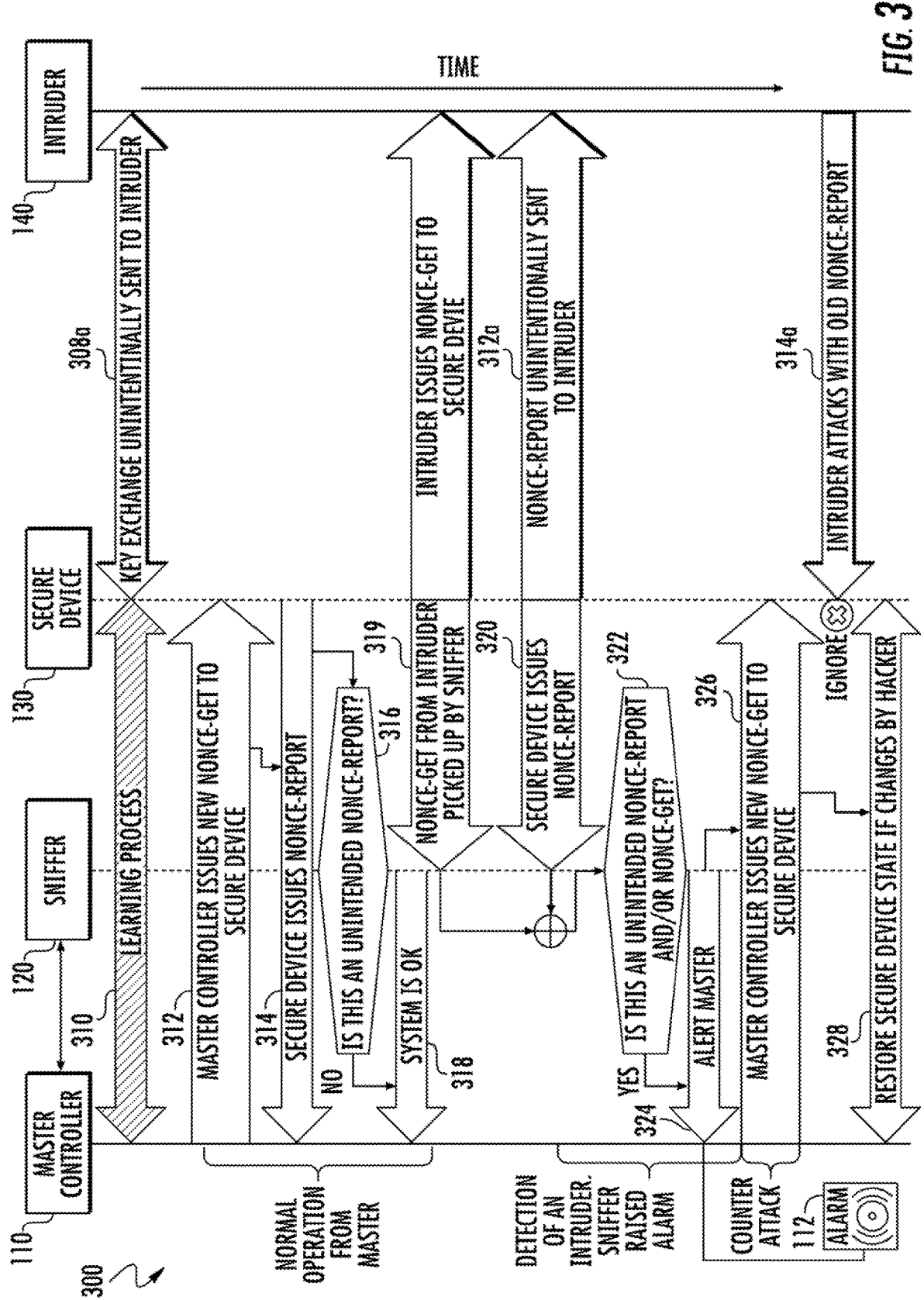
FIG. 3 is a flow chart of a method of securing the operation of a wireless communication system, in accordance with an embodiment of the disclosure.

Referring now to FIG. 3, with continued reference to FIGS. 1-2. FIG. 3 shows a flow chart of a method 300 of securing the operation of a wireless communication system in accordance with an embodiment of the disclosure. Specifically, FIG. 2 shows how the wireless communication security system 100 may be used to prevent an intruder 140 from gaining control of the secure device 130. As mentioned above, the wireless communication security system 100 includes a master controller 110 and a sniffer 120 in electronic communication with the master controller 110.

The learning process 310 that was discussed in FIG. 2 and occurs over blocks 204, 206, 208, and 210 initiates method 300. As mentioned above, during the learning process 310 the key is exchanged between the secure device 130 and the master controller 110. Also, during the teaming process 310, the key is unintentionally sent to the intruder 140 at block 308a. Utilizing the sniffer 120, the master controller 110 carries out a different operation than was discussed above. Under the operation in FIG. 3, the master controller 110 issues a NONCE-GET to the secure device 130 at block 312. Then the secure device 130 issues a NONCE-REPORT to the master controller 110. The sniffer 120 detects the NONCE-REPORT from the secure device 130 and determines whether this is an unintended NONCE-REPORT at block 316. Additionally, the sniffer 120 may also detect the NONCE-GET from the master controller 110 and determines whether this is an unintended NONCE-GET. If the NONCE-REPORT is not an unintended NONCE-REPORT, the sniffer 120 transmits a signal to the master controller 110 indicating that the system 100 is OK (i.e. no intruder 140 has been detected).

An attempted hack is shown by blocks 310a, 312a, and 314a. At block 310a the intruder 140 issues a NONCE-GET to the secure device 130. The sniffer 120 receives the NONCE-GET from the intruder 140 at block 319. Then the secure device 130 issues a NONCE-REPORT to the master controller 110 at block 320 as well as the intruder 140 at block 312a. At block 322, the sniffer 120 determines that at least one of the NONCE-GET and the NONCE-REPORT is unintended, and then alerts the master controller 110 at block 324. If the sniffer 120 is contained within the controller 110, the alert may not be needed as the sniffer 120 and the controller 110 are one and the same. The sniffer 120 may determine that the NONCE-GET and/or the NONCE-REPORT is unintended if no NONCE-GET was issued by the master controller 110. The master controller 110 uses an electronic channel to intimate the sniffer 120 prior to any secure operation being performed. Once the master controller 110 is alerted, the master controller 110 may activate an alarm 112 to alert a user of the master controller 110 that a hack is being attempted on the secure device 130. The alarm 112 may be visual and/or audible. In an example the alarm 112 may be a remote notification such as, for example an SMS or an email. Also, once the master controller 110 is alerted, the master controller 110 initiates a counter attack to prevent the intruder from gaining, over the secure device 130. The counter attack includes that the master controller 110 will issue a new NONCE-GET to the secure device 326, thus replacing the NONCE-GET from the intruder 140. So now when the intruder attacks the secure device 130 with the old NONCE-REPORT and key at block 314a, the secure device 130 will ignore the attack. Subsequently, the master controller will restore the secure device 130 state if it was changed by the intruder 140 at block 328.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed b a computer, the computer becomes a device for practicing the embodiments, Embodiments can also be in the form of computer program code, for example, whether stored in a storage medium, loaded into and/or executed by a computer, or transmitted over some transmission medium, loaded into and/or executed by at computer, or transmitted over some transmission medium, such as over electrical wiring, or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended t include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular firms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a secure wireless network between a master controller and a secure device, the method comprising:
   detecting at least one of a NONCE-GET and a NONCE-REPORT using a sniffer configured to detect wireless signals from a selected wireless protocol;
   determining that the NONCE-GET was not transmitted by a master controller or that the NONCE-REPORT was not in response to a NONCE-GET transmitted by the master controller, the master controller being in electronic communication with the sniffer;
   determining that an intruder is attempting to perform a hack attempt on the secure device to gain access to the secure device based on determining that the NONCE-GET was not transmitted by the master controller or that the NONCE-REPORT was not in response to the NONCE-GET transmitted by the master controller;
   initiating a counterattack in response to the hack attempt to prevent the intruder from gaining access to the secure device by transmitting a new NONCE-GET to the secure device from the master controller to obtain a new key so that the master controller and the secure device can operate over a new secure connection; and
   restoring the state of the secured device after the master controller transmits the new NONCE-GET to the secure device;
   wherein the selected wireless protocol is Z-Wave protocol.

2. The method of claim 1, wherein:
   the sniffer is separate and apart from the master controller.

3. The method of claim 1, wherein:
   the sniffer is contained within the master controller.

4. The method of claim 1, further comprising:
   activating an alarm on the master controller when it is determined that the NONCE-GET was not transmitted by a master controller or that the NONCE-REPORT was not in response to a NONCE-GET transmitted by the master controller.

5. A wireless communication security system comprising:
   a sniffer configured to detect wireless signals from a selected wireless protocol;
   a master controller in electronic communication with the sniffer and configured to wirelessly control a secure device, the master controller comprising;
   a processor;
   a memory comprising computer-executable instructions that, when executed by the processor, cause the processor to perform operations, the operations comprising:
   detecting at least one of a NONCE-GET and a NONCE-REPORT using the sniffer;
   determining that the NONCE-GET was not transmitted by a master controller or that the NONCE-REPORT was not in response to a NONCE-GET transmitted by the master controller, the master controller being in electronic communication with the sniffer; determining that an intruder is attempting to perform a hack attempt on the secure device to gain access to the secure device based on determining that the NONCE-GET was not transmitted by the master controller or that the NONCE-REPORT was not in response to the NONCE-GET transmitted by the master controller;
   initiating a counterattack in response to the hack attempt to prevent the intruder from gaining access to the secure device by transmitting a new NONCE-GET to the secure device from the master controller to obtain a new key so that the master controller and the secure device can operate over a new secure connection; and
   restoring the state of the secured device after the master controller transmits the new NONCE-GET to the secure device;
   wherein the selected wireless protocol is Z-Wave protocol.

6. The wireless communication security system of claim 5, wherein:
   the sniffer is separate and apart from the master controller.

7. The wireless communication security system of claim 5, wherein:
   the sniffer is contained within the master controller.

8. The wireless communication security system of claim 5, wherein the operations further comprise:
   activating an alarm on the master controller when it is determined that the NONCE-GET was not transmitted by a master controller or that the NONCE-REPORT was not in response to a NONCE-GET transmitted by the master controller.

9. A computer program product tangibly embodied on a non-transitory computer readable medium, the computer program product including instructions that, when executed by a processor, cause the processor to perform operations comprising:
   detecting at least one of a NONCE-GET and a NONCE-REPORT using a sniffer configured to detect wireless signals from a selected wireless protocol;
   determining that the NONCE-GET was not transmitted by a master controller or that that the NONCE-REPORT was not in response to a NONCE-GET transmitted by the master controller, the master controller being in electronic communication with the sniffer; determining that an intruder is attempting to perform a hack attempt on the secure device to gain access to the secure device based on determining that the NONCE-GET was not transmitted by the master controller or that the NONCE-REPORT was not in response to the NONCE-GET transmitted by the master controller;
   initiating a counterattack in response to the hack attempt to prevent the intruder from gaining access to the secure device by transmitting a new NONCE-GET to a secure device from the master controller to obtain a new key so that the master controller and the secure device can operate over a new secure connection;

restoring the state of the secured device after the master controller transmits the new NONCE-GET to the secure device;
wherein the selected wireless protocol is Z-Wave protocol.

10. The computer program of claim 9, wherein:
the sniffer is separate and apart from the master controller.

11. The computer program of claim 9, wherein:
the sniffer is contained within the master controller.

12. The computer program of claim 9, wherein the operations further comprise:
activating an alarm on the master controller when it is determined that the NONCE-GET was not transmitted by a master controller or that the NONCE-REPORT was not in response to a NONCE-GET transmitted by the master controller.

* * * * *